Figure 3:
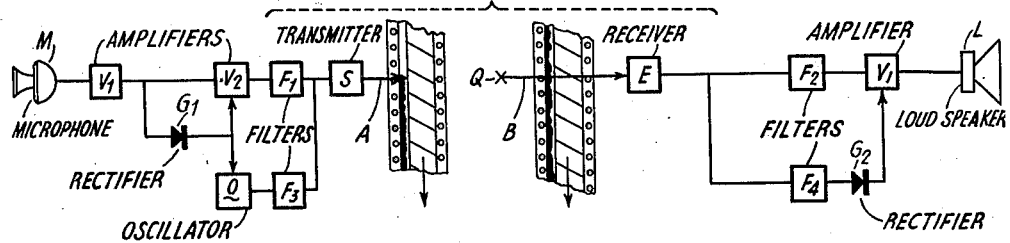

Dec. 22, 1936.    K. ETZRODT    2,065,489
TRANSMISSION LEVEL CONTROLLING ARRANGEMENT
Filed July 14, 1932    2 Sheets-Sheet 1
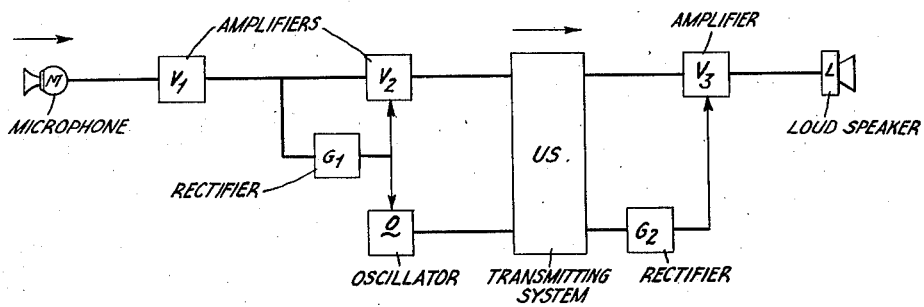
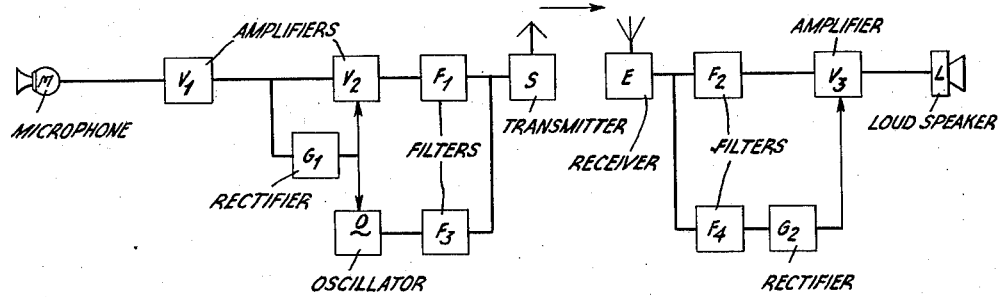
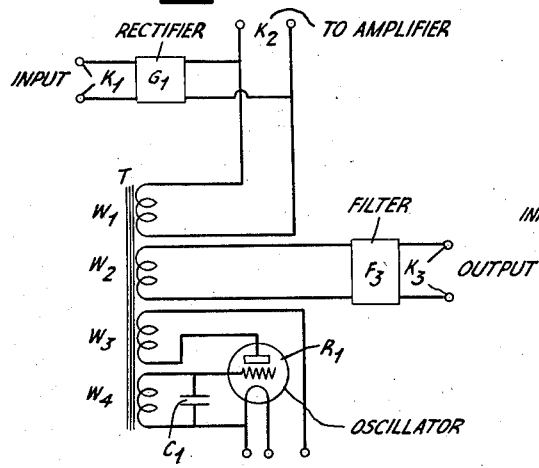
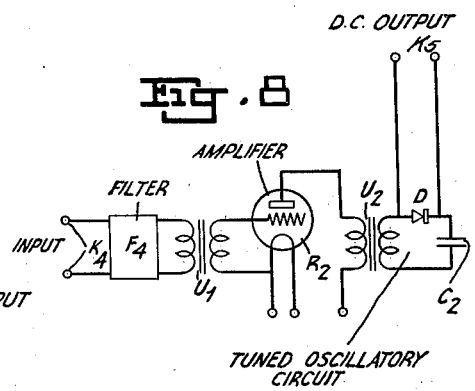
INVENTOR
KARL ETZRODT
BY
ATTORNEY Dec. 22, 1936.  K. ETZRODT  2,065,489

TRANSMISSION LEVEL CONTROLLING ARRANGEMENT

Filed July 14, 1932  2 Sheets-Sheet 2

INVENTOR
KARL ETZRODT
BY
ATTORNEY

Patented Dec. 22, 1936

2,065,489

UNITED STATES PATENT OFFICE 2,065,489

TRANSMISSION LEVEL CONTROLLING ARRANGEMENT

Karl Etzrodt, Siemensstadt, near Berlin, Germany, assignor to Siemens & Halske, Aktiengesellschaft, Siemensstadt, near Berlin, Germany, a corporation of Germany Application July 14, 1932, Serial No. 622,436
In Germany July 20, 1931

5 Claims. (Cl. 178—44)

The reproduction of electrically transmitted music, voice, and the like, under natural dynamic conditions, i. e., with perfect preservation of the time variations of sound volume differences, is attended with serious difficulties which primarily reside in the properties of the transmission means. If the transmission system, for instance, consists of a line with amplifiers or repeaters, then a lower limitation is set to the amplitude of the currents to be transmitted by the disturbing noises existing in the line, while an upper limit is set by the liminal modulation of the amplifiers, permissible coil load and the danger of cross-talk. In transmission by phonographic records the lower limit of sound volume is set by the needle noises, and the upper limit by the "pitch" of the sound track. A similar situation holds true of the transmission by a sound-film in which the volume of the recorded sound must range between limits being fixed, on the one hand, by the noise level, and, on the other hand, by the scope of the density or shading scale or the width of the acoustic record. In wireless transmission, such as by broadcast, the sound volume likewise should not fall below a definite value for reasons of atmospheric and other disturbances of reception, while in upward sense the same is limited by the available transmitter power.

For these reasons it has been found essential in recording to limit the natural dynamic condition by manual or automatic regulation, e. g., by the aid of amplitude limiters, to a considerable degree, though this will frequently cause a considerable impairment of the natural expression of the transmitted "sound picture".

Starting from a correct interpretation of the fact that the technical compulsion of limiting the dynamic condition is not influenced so much by the reproducing apparatus as (indeed, almost exclusively) by the transmission means, arrangements have previously been disclosed whereby it is possible to restore natural dynamic condition to a certain extent upon reproduction. Heretofore certain methods used for this purpose have been known to employ a control current whose amplitude upon recording, or before the useful currents enter into the transmission means which is designed to restrict dynamic conditions, is regulated by suitably chosen amplitude limiters. This affords a chance, by the aid of a regulating amplifier subject to the control current, to restore the original amplitude relations and conditions upon reproduction of the transmitted currents, or at the end of the transmission means.

But such an arrangement involves the disadvantage that it is predicated in its operation upon the damping. For instance, if the transmitted useful currents and the control current, owing to the frequency-dependence of the damping of the transmission means or path, become subject to dissimilar damping, difficulties are encountered in an attempt to insure regulation at the end of the transmission means in a way which is required for the natural reproduction of the original sound volume relations, since the amplitude of the control frequency no longer represents a perfect measure or criterion for the change in damping effected at the beginning of the transmission means or path.

These drawbacks according to the method here disclosed are obviated in that the measure, extent or degree of the limitation put upon the amplitude range at the time of recording or at the beginning of the transmission system is transmitted in the form of a frequency change. The latter may be accomplished in various ways. For example, it is possible to utilize a single control current whose frequency is altered in dependence upon the damping regulator used at the time of recording or at the beginning of the transmission system, or at least simultaneously therewith so that it will represent always a perfect measure independent of all variations of the damping for the change in the damping brought about at the beginning of the transmission system.

The transmission of the variable control frequencies may be effected conjointly with the currents to be controlled, this being done inside a frequency range located outside the frequency band of the currents to be controlled. Indeed, the said frequency range may be below or above the audio frequency band. In some instances, however, the lower frequency band should be preferred, e. g., in radio transmission and in the use of phonograph records, for in this case the use of the upper range would be attended with difficulties owing to the chances of trouble caused by transmitter stations working upon a neighboring wave or because of the fact that the higher frequencies are less favorably handled. The use of the lower frequency band in this connection means no practical drawback since the lower frequency limit of the sound reproducer (loudspeaker) as a rule lies considerably above the lower frequency limit of amplifiers.

As to the rest, it is possible to produce the requisite frequency change also in the form of an alteration in an impulse frequency provided that the rate of regulating speed conditioned by the impulse frequency does not become unduly small. The variable impulse frequency, for instance, could be transmitted in the shape of a modulation of a control current.

A certain risk connected with the use of the lower frequency band for the transmission of the control frequency may reside in that in the joint transmission of the control frequencies and the useful currents to be controlled thereby, by way of transmission means having a non-linear characteristic (for instance, an audion) production of combinations may occur. However, this risk could be readily obviated by making the amplitude of the control frequencies sufficiently small. This involves a further advantage over the known method wherein the amplitude of the control current constituted the measure and criterion for the regulation to be effected so that the occurrence of large amplitudes of control current could not be avoided.

In the drawings a number of fundamental embodiments and applications of the method of the invention are illustrated by way of example.

Figure 1 shows a fundamental scheme according to which any desired type of transmission system may be utilized. Figure 2 shows the use of the idea as applied to radio transmission, Figures 3 to 6 illustrate the present invention applied to other embodiments whereas Figures 7 and 8 show details of the circuit schemes.

Referring to Figure 1, M denotes the microphone, and L a loudspeaker, e. g., for the recording and the reproducing of music. The alternating currents derived from the microphone M are first amplified by the aid of amplifiers V1 and V2, and, after transmission through any suitable transmission system US, amplified by a further amplifier V3 before they are fed into the loudspeaker L. Owing to limitations imposed by limited transmission properties of the transmission system US the amplifier V2 is of the regulatory type in that its gain is made regulable by the aid of currents branched off therefrom and rectified by G1, and made dependent upon the amplitude of the currents to be transmitted. Regulation may be effected by ways and means well known in the art, for instance, by a shift in the grid potential, by operation of a potentiometer or the like.

The rectified currents coming from rectifier G1 are used at the same time for the purpose of correspondingly altering the frequency of an oscillator O. The frequency of the latter, as will thus be noted, represents a measure of whatever changes in damping have been brought about in the amplifier V2.

After transmission through the transmission system US the control frequencies are rectified by a rectifier G2 in such a way that the D. C. potential arising in the output circuit of the rectifier constitutes always a measure of the frequency of the incoming control current and thus a measure and gauge for the change in damping effected in the amplifier V2.

Now, this control D. C. potential is utilized for correspondingly changing the gain of the regulable amplifier V3, so that whatever change, i. e., increase or decrease in the damping, has occurred in the amplifier V2 will be compensated wholly or partly by a corresponding decrease or increase in the damping, with the result that the music will be rendered by the loudspeaker in a more or less faithful manner. Regulation of the amplifier V3 may be insured in known manner, for instance, by a shift in the grid potential or by the control of a potentiometer or of damping elements.

Regulation of amplifier V2 and the simultaneous change in control frequency need not, as shown, be insured automatically by the agency of the currents to be transmitted, indeed, it suffices in certain instances to accomplish such regulation manually, for instance, in accordance with the readings or indications of a volume measuring device. Also, in that case, the automatic restoration of the original dynamic conditions is effected in reproduction in a way as hereinbefore described.

Figure 2 illustrates an application of the basic idea of this invention to a radio transmission system in which the control frequency is infraposed in reference to the audio frequency band to be transmitted. The alternating currents coming from the microphone M, after having been reinforced by the amplifier V1, are fed into the regulating amplifier V2. Conjointly with the adjustment of the gain of this amplifier there occurs a corresponding change in the frequency of the oscillation generated by oscillator O by action of the D. C. potential furnished from the rectifier G1 and corresponding to the amplitude of the useful currents to be transmitted.

The output of the regulatory amplifier V2 includes a filter F1 permeable to the audio frequency band, whereas the control frequencies are transmitted through a low-pass filter F3 whose upper frequency limit is determined by the highest occurring control frequency and which suitably lies below the lower liminal frequency of the high pass filter F1. After transmission through the two filters the useful currents combine with the control currents so that modulation of transmitter S is accomplished jointly by both.

After passing through the receiver E the useful currents are again separated from the control currents by the aid of suitable filters F2 and F4. The control currents flowing through the filter F4 are rectified in the rectifier G2; and also in this instance the ensuing D. C. potential is a function of the frequency and is used for the corresponding regulation of the amplifier V3.

Figure 3 illustrates the use of the scheme in connection with sound film transmission. In lieu of the radio transmitter, Figure 2, there is provided here an optical recording arrangement S which, as well known in the prior art, converts the incoming electrical oscillations into variations of luminosity or lateral fluctuations of a pencil of light A which impinges upon a film strip subject to a constant rate of speed and which here insures an optical record or track corresponding to the electrical impulses or current variations. Upon reproduction, the sound film strip, by ways and means known from the art of sound film, is scanned or is subject to transmission of a light ray pencil B issuing from the source Q, with the result that the ray pencil impinging upon the receiver apparatus E will vary in luminosity in accordance with the optical record upon the sound film. The receiver equipment E, as known, comprises a photo-electric cell adapted to translate the fluctuations or variations in the intensity of the light ray pencil into electric impulses; and furthermore an amplifier designed for the amplification of the electric variations furnished from the said photo-cell. The superposition of the acoustic oscillations coming from the microphone and the oscillations of the control current employed for insuring the control action, upon the transmitter end, and the separation of the said controlling current and the acoustic oscillations as well as the regulation of an amplifier by the rectified control currents is secured in the same manner as already indicated in Figure 2 in reference to wireless transmission.

Figure 4:
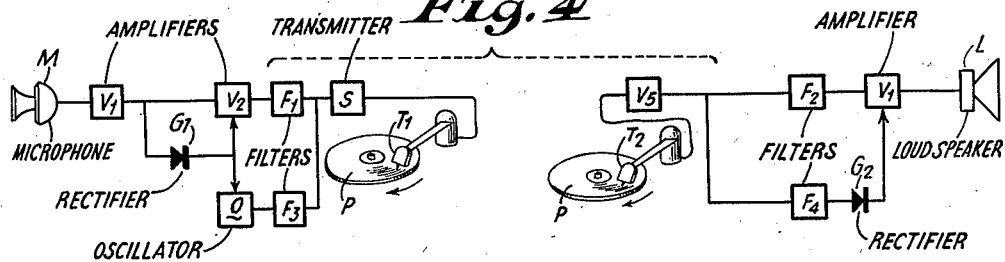

Figure 4 schematically shows ways and means of substituting a phonograph record disk for film transmission. At the sending end, the acoustic oscillations are amplified in an amplifier V4 conjointly with the control current, and thereupon fed to acoustic recorder means T1 whereby the electrical impulses are translated into mechanical movements of a stylus or engraving needle, the sound being thus recorded upon the revolving disk P. At the receiving end, the sound pick-up T2 scans the disk record P, the said pick-up reconverting into electric oscillations the mechanical oscillations engraved in the disk, the ensuing electric impulses being fed to an amplifier V5. Above the latter is effected a separation of the control current and the acoustic current by the intermediary of filters and the regulation of an amplifier located below the loudspeaker for the acoustic currents, in a way as has been pointed out before and shown in Figure 2.

Figure 5:
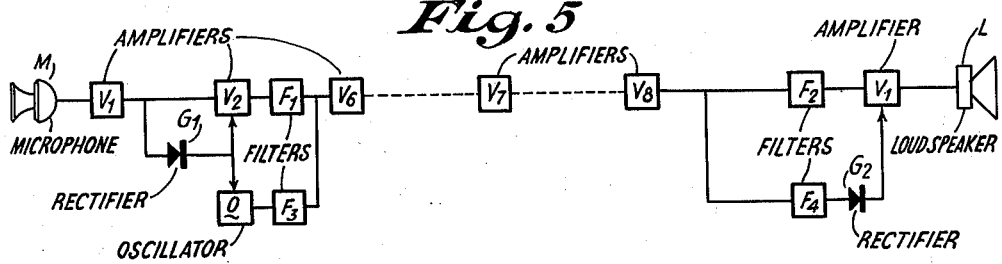

The invention is useful also for wire transmission systems comprising amplifier equipment. An instance of this kind is shown by way of example in Figure 5. At the sending end, acoustic currents and control current are combined and jointly amplified in amplifier V6 mounted at the beginning or input end of the transmission line. The latter contains any desired number of amplifier or repeater stations, though of these merely station V7 is indicated in Figure 5. At the receiving end of the line, above and beyond amplifier V8, separation of the control current is again effected as well as regulation of the amplifier for the acoustic currents by rectified control current being dependent for its frequency upon the regulator process at the sending end.

Figure 6:
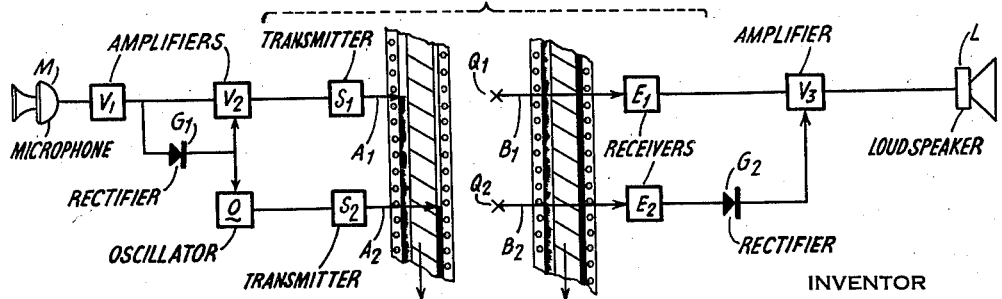

Whereas the exemplified embodiments shown in Figures 2 to 5 are predicated upon that the control current is transmitted conjointly with the acoustic current, Figure 6 by way of example indicates a scheme of transmitting the control current separately and independently of the acoustic currents. This idea is applicable to any desired kinds of transmission systems. Figure 6 shows its use in connection with sound film transmission. At the outgoing end, the acoustic currents coming from the microphone are fed to a recording device S1 which by the aid of a light ray pencil A1 acted upon by the electric oscillations insures corresponding recording upon part of the film strip. For the control frequency coming from the oscillator O there is provided a separate recorder device S2 which also by the agency of a light ray pencil A2, also subject to action by the control current, secures an optical record upon another portion of the sound film strip. At the receiving end, the sound film strip, on the one hand, is scanned by a light ray pencil B1 issuing from the light source Q1, said pencil B1 being caused to impinge upon an optical receiver apparatus E1, while, upon the other hand, there is transmitted therethrough for scanning a light ray pencil B2 coming from a light source Q2 with a view to insure suitable control actions upon the optical receiver outfit E2. The two receiver apparatus E1 and E2, as well known in the prior art, may comprise photo-electric cells and amplifiers as indicated in the arrangement Figure 3.

Above the receiving equipment E1, the acoustic currents are amplified in the amplifier V3 and are thereupon fed into the loudspeaker L, whereas the control current furnished from the receiver E2 is fed into a rectifier arrangement G2 which furnishes a D. C. voltage being for its size or amplitude dependent upon the frequency of the control current, in order to thereby regulate the amplifier V3.

Whenever the damping over the path of transmission of the control frequency, or, generally the damping throughout the entire transmission system is subject to marked fluctuations and changes—as will be particularly true of radio transmission systems—or when the amplitude, for instance, of the control current for any reasons at all, exhibits an undesirable dependence upon the prevailing frequency, then it will be recommendable to provide at some suitable point along the transmission system amplitude regulator means or amplitude limiting means, with a view to stabilize as far as feasible the damping in the transmission system for the currents to be transmitted or at least for the control current and to thus preclude any vitiation of the desired control action or process.

An exemplified instance of such a scheme is shown in Figure 7, to be more precise, for the use of the idea in connection with a radio transmission system of the kind illustrated in Figure 2. The radio receiver E, shown in Figure 2, is shown in more detail in the schematic illustration Figure 7, and the same consists of a radio frequency amplifier H, an audion tube or other detector A, and an audio frequency amplifier N. In order that changes in damping over the radio path may be compensated, the gain of the radio frequency amplifier H, as well known in the earlier art, is made a function of the rectified current of the audion tube or other detector A, as indicated by the arrow. What is thus insured is that the gain of the radio frequency amplifier is altered or regulated in accordance with the damping fluctuations on the radio path. As to the rest, the arrangement is the same as the one shown in Figure 2.

Under certain circumstances, it may be advantageous to provide, in addition to this general regulation of the incoming current as shown in Figure 7, a separate regulation of the control current, or else only this latter regulation. An instance is shown by way of example in Figure 8. The receiving path of the branched off control current comprised between the filter F4 and the rectifier arrangement G2 contains here a separate amplitude limiter which may consist, for instance, of an amplifier V9 and a rectifier G3 branched off in the rear of (or above) the amplifier. The rectified potential furnished from the said rectifier G3, by ways and means well known in the prior art, regulates the gain of the amplifier V9 in such a mode that amplitude fluctuations of the control current will be largely precluded. One particular merit of this scheme is that the rectified potential furnished from the rectifier G2 and serving for the control of the amplifier V3 as regards its size, is exclusively a function of the frequency, but not of the amplitude of the incoming control currents. At the sending end, the use of such amplitude limiting means, generally speaking, is not necessary, inasmuch as the amplitude of the control current supplied from the oscillator O is stabilizable to an adequate degree by the aid of other means.

Figure 7 illustrates one of the many conceivable ways and means of making the frequency of the control current dependent upon the size of a rectified potential. By way of the terminals K1 the alternating currents by the amplitudes of which the ensuing frequency is to be governed are fed to a rectifier G1. The rectified currents are branched in the output of the rectifier, one part reaching the winding W1 of a special transformer T, while another part is brought to the terminals K2 whence the latter part is used for regulation of an amplifier in a way as illustrated in Figures 1 and 2, for instance.

The said winding W1 belongs to a transformer T whose iron-core supports an aggregate number of four different windings. Winding W4 conjointly with condenser C1 constitutes an oscillation circuit which is included in the grid circuit of an oscillator tube R1. Generation of waves is effected in well known manner in that the plate circuit, by the aid of the winding W3, is in feed-back relation with winding W4 of the grid circuit. The frequency of the ensuing wave essentially is governed by the inductance W4 and the capacity C1. Now, the inductance W4 is variable within wide limits by altering the saturation of the iron-core, this being accomplished, in the exemplified embodiment here illustrated, by impressing the D. C. coming from the rectifier G1 upon a distinct biasing winding W1. The saturation of the iron and thus also the frequency of the alternating current generated by the oscillator tube therefore are a function of the amplitude of the alternating currents conducted by way of the terminals K1. Feeding (collecting) of the ensuing control frequency is insured by way of an additional winding W2 the terminals or ends of which are associated with terminals K3 by way of a filter F3 having a range of transmission adapted to the variations of the control frequency that may be expected.

If necessary, the circuit arrangements could be so chosen that between the amplitude of the alternating potential applied across terminals K1 and the frequency of the alternating control current collected across the terminals K3 there prevails a linear inter-relationship.

The circuit scheme shown in Figure 8 illustrates a method of producing by the control frequency a D. C. potential whose size bears a definite relation to the frequency of the controlling current. The control current is fed by way of the terminals K4 and after transmission through a filter F4 it is fed through a transformer U1 to the grid circuit of an amplifier tube R2 whose plate circuit includes the primary winding of a transformer U2. The secondary winding of the latter conjointly with the condenser C2 constitutes an oscillatory circuit, the latter most suitably being tuned to a frequency close to the upper or lower limit of the range of the control frequency. The volume of the current flowing in the oscillation circuit is therefore in well known manner made a function of the frequency of the current fed into the same since operation takes place upon the rising or drooping branch of the resonance curve.

Rectification of the alterating current flowing in the oscillation circuit is accomplishable in any desired manner, e. g., in a manner as shown, by the aid of an electrolytic rectifier or detector D being connected in series relation with the inductance and capacity of the oscillation circuit. Across the terminals K5 which are united with the two poles of the rectifier there thus arises a D. C. potential the size of which depends in a definite way upon the control frequency supplied by way of the terminals K4. If the circuit scheme is suitably chosen the ensuing D. C. potential for control may, for instance, be proportional to the control-frequency input.

I claim:

1. The method of transmitting waves of a wide energy range employing a medium capable of transmitting only a narrow energy range, which method comprises producing a change in the range of the energy to be applied to said medium, generating control oscillations varying the frequency of said control oscillations simultaneously with and as a function of the change produced in said energy range and controlling the reproduction of the transmitted energy in accordance with the frequency of said control oscillations thereby to restore the original wide energy range of said waves.

2. In a signaling system, a transmitting medium capable of transmitting a relatively narrow range of volume, means for generating signaling energy varying in volume over a wider range than that which the transmitting medium will carry, means for variably attenuating said signaling energy and then impressing the same upon said transmitting medium, said attenuating means being operative under control of variations in the volume of the signaling energy as derived from its source, a source of control oscillations variable in frequency in response to variations in the effects upon said attenuating means, a receiver responsive to signaling energy as carried by said transmitting medium, and means responsive to the reception of said control oscillations for restoring to said signaling energy at the receiver the range of volume which it possessed at the point of origin.

3. The method of attenuating and then rebuilding signaling energy to its original volume range which comprises amplifying the energy as derived from its source, rectifying a portion of said energy, utilizing the rectified portion of said energy to level off the impress of the unrectified portion upon a transmitting medium, further utilizing the rectified portion of said energy to variably control the frequency of oscillations separately generated, said control being in accordance with the original volume variations in the signaling energy, transmitting both the leveled-off energy and the separately generated oscillations over said transmitting medium to a point of reception, and utilizing the variations in the frequency of the separately generated oscillations to rebuild said leveled-off energy into variable amplitude energy corresponding in range with that of the signaling energy at its source.

4. In a signalling system, a transmission medium, an adjustable transmission element at the transmitting end of said medium, means to apply modulated signalling current to said transmission element, means to compress the amplitude variations of said modulated signalling current within a range more limited than that of the original signalling current, a source of oscillations the frequency of which is variably determined in accordance with the variations of amplitude of said signalling current, means for transmitting said oscillations for volume control purposes over said transmission medium, a receiving station at the remote end of said transmission medium, and means included in said receiving station and acting in dependence upon the variations of said volume control oscillations for variably expanding the amplitude range of the signalling currents thereby to restore the amplitude range which they originally possessed.

5. The method of maintaining substantially constant the volume of a band of message frequencies while transmitting the same over a communications channel which comprises utilizing the band of message frequencies to be transmitted to automatically vary the frequency of a source of controlling oscillations outside the band in response to and in accordance with the instantaneous variations in said band, transmitting said message frequencies and the different frequencies of said controlling oscillations simultaneously over said channel, and utilizing the variations in the frequency of the controlling oscillations to restore the amplitude variations of the original message frequencies at the point of reception.

KARL ETZRODT.